United States Patent [19]

Alaburda

[11] 3,920,477
[45] Nov. 18, 1975

[54] COMPACT BATTERY
[75] Inventor: Raymond Daniel Alaburda, Wilmington, Del.
[73] Assignee: E. I. Du Pont de Nemours and Company, Wilmington, Del.
[22] Filed: May 1, 1974
[21] Appl. No.: 465,875

[52] U.S. Cl. ............................. 136/108; 136/111
[51] Int. Cl. .......................................... H01m 23/00
[58] Field of Search .................. 136/111, 108–109, 136/172, 133, 134

[56] References Cited
UNITED STATES PATENTS

| | | | |
|---|---|---|---|
| 3,078,329 | 2/1963 | Granger | 136/108 |
| 3,563,805 | 2/1971 | Deierhoi, Jr. | 136/111 |
| 3,655,452 | 4/1972 | Cich | 136/111 |
| 3,726,717 | 4/1973 | Zaleski | 136/111 |
| 3,801,373 | 2/1974 | Spellman | 136/111 |

Primary Examiner—Anthony Skapars

[57] ABSTRACT

A thin, flat battery containing at least two galvanic cells, the cells being disposed in monoplanar configuration and the battery comprising at least one flat conductive plate which contacts the anode of one cell and the cathode of an adjacent cell.

5 Claims, 5 Drawing Figures

COMPACT BATTERY

BACKGROUND OF THE INVENTION

An important area in the continuing development of electric batteries is the provision of more energy in smaller packages. High energy density batteries which employ light metals, especially lithium, as anodes are outstanding in this regard. One desirable configuration for modern batteries is a thin, flat shape of roughly the area of a playing card and an only slightly greater thickness. Batteries of this shape can be incorporated in small cameras, or film packs to be used in cameras, to provide power for advancing film and for other camera functions. They can also be used in recorders, small radios, instruments and any such device which uses a relatively small amount of power.

Flat galvanic cells have previously been disclosed in many forms. The character of thin flat cells is such that, because of the limited amount of active material employed, they deliver only a small amount of energy before they must either be recharged or discarded. On the other hand, because a large proportion of the total active material is always available for use, due to the high area to volume ratio, they can furnish momentary surges of relatively large amounts of energy on demand.

However, any single galvanic cell furnishes a voltage which is limited by the nature of the anode and cathode materials used. If higher voltage is required, cells are combined in series connection, thereby multiplying the voltage. In the past, single flat galvanic cells have been assembled into batteries by stacking one on top of the other, the anode of one cell facing the cathode of the next. Such a combination requires additional space, which is objectionable for some applications of the batteries. Alternatively, the cells can be placed in side by side or other geometric relationship with conductive strips or wires connecting the cathode of one cell to the proper electrode of another cell, but with this technique, additional materials must be used in the construction of the batteries and the time and effort involved in their construction are increased.

Accordingly, a need exists for a flat battery of this type having minimal size and few component parts.

SUMMARY OF THE INVENTION

The battery of the instant invention provides a high-voltage multi-cell battery using fewer component parts than the same number of individual cells and which is easily assembled with automatic equipment.

Specifically, the invention provides, in a battery of at least two flat galvanic cells of the type having a cathode and an anode of thin, flat configuration, a porous nonconductive separator between the cathode and the anode, and a conductive electrolyte contacting the anode, the cathode and the separator, the cells being disposed in the same plane and spaced apart from one another, the improvement comprising at least one first plate current collector contacting an anode and cathode of two adjacent cells and providing at least part of a sidewall of the battery, and two second plate current collectors, each contacting the opposite electrode of one cell with which a first plate current collector is in contact, the second plate current collectors providing at least part of a sidewall of the battery.

DETAILED DESCRIPTION OF THE INVENTION

Figure 1:
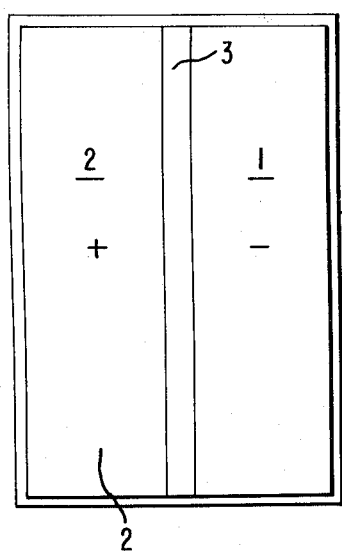
FIG. 1 is a top plan view of a two-cell battery of the invention.

The present invention provides a battery having a single conductive plate, which is an integral part of the battery and connects an anode of one cell to a cathode of a second cell. In assembly, for a two-cell battery, only three conductive plate current collectors are required instead of the normal four. While the following description is directed to a battery having the cells in series connection, a parallel arrangement can be similarly made, though with little advantage over a single cell of the same electrode area.

The batteries of the instant invention have flat cathodes and anodes of the type well known to those skilled in the art. One side of a first plate current collector contacts the anode of one cell and the cathode of a second. One or both of the electrode materials can optionally be coated on to a desired area of the first plate current collector. Full electrical contact of this plate current collector with the active anode material of one cell and the active cathode material of the second cell of the battery is necessary.

The plate current collector is a flat conductive sheet which contacts the active anode or cathode materials on its inner side and its second side provides at least part of an outer wall for the battery. The active anode and cathode material can be coated on a conductive carrier plate through which it contacts the plate current collector or can be of a unitary nature of the electrode material alone and contact the plate current collector directly. At its second surface the active material contacts a nonconductive porous separator which separates it from active material of opposite polarity. The second active electrode material faces the first active electrode material with the separator between the two. The second active material can also either be coated on a conductive carrier plate or it can be of integral unitary nature. In either case the second active electrode material is operatively in contact with the inner side of the second conductive current collector which provides the second wall of the battery with its outer side. A conductive electrolyte suffuses the area between anode and cathode and substantially fills the volume enclosed in the cell. The described relationship of anode-separator-electrolyte-cathode is established for each cell, and the cells are hermetically sealed by means of plastic gaskets in the known manner.

The invention is illustrated in the drawings, in which like parts are designated by the same numbers.

Figure 2:
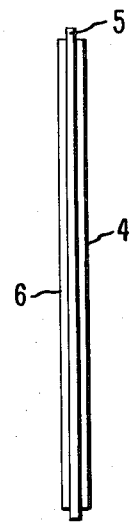
FIG. 2 is a side view of the battery of FIG. 1.
Figure 3:
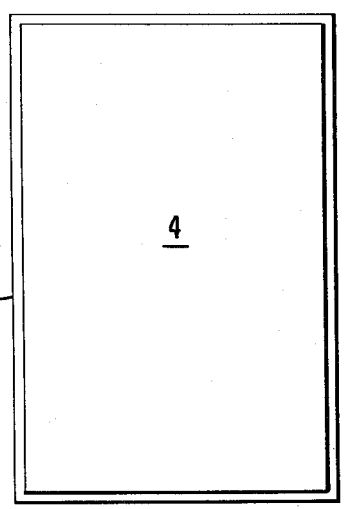
FIG. 3 is a bottom plan view of the battery of FIG. 1.

In FIG. 1, second plate current collector 1 provides the negative pole of the battery, while another second plate current collector 2 provides the positive pole of the battery. Three represents a space between 1 and 2 through which the first plate collector on the other side of the battery shows. In FIG. 2, 4 is the first plate current collector which is on the bottom side of the battery in FIG. 1, while nonconductive gasket 5 seals the edges of the conductive plates sidewalls around the individual cells and 6 is the edge of the second plate current collector 1. In FIG. 3, 4 again represents the first plate current collector at the bottom of the battery.

Figure 4:
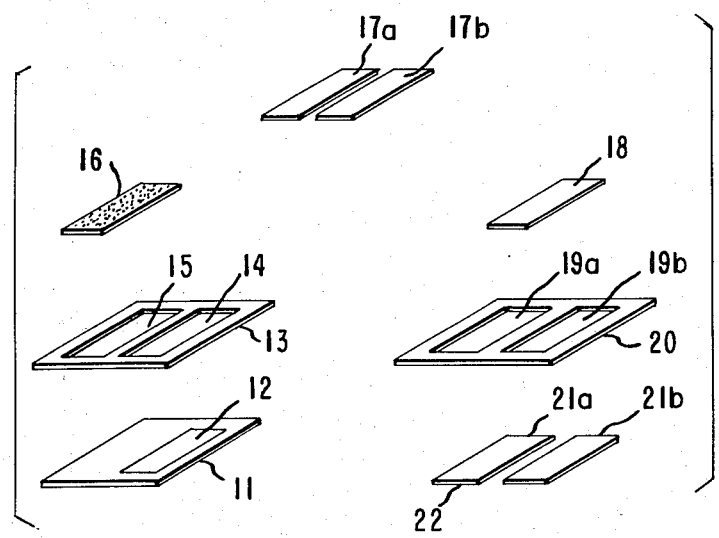
FIG. 4 is an illustration of the component parts of a battery of the invention.

FIG. 4 shows the component pieces of the battery of FIG. 1. Element 11 is the first plate current collector with cathode active material 12 deposited directly thereon; 13 represents a nonconductive plastic gasket with windows 14 and 15 cut out therefrom; 16 is an anode of lithium on steel, lithium side up and fitting in cut-out window 15; 17a and 17b are nonconductive porous separators, 17a placed over anode 16 and 17b placed in cut-out window 14. The anode and separators are sized and shaped so as to fit snugly into cut-out windows 14 and 15.

In regular assembly of the present batteries, when the two separators are in place, they are saturated with electrolyte solution, then assembly is continued. Reference Number 18 is a second anode like 16 and is placed on separator 17b, lithium side down; 20 is a nonconductive plastic gasket duplicating 13 and placed congruently over the already assembled parts of the battery, with cut-out windows 19a and 19b framing porous separator 17a and anode 18; 21a is a second plate current collector with cathode active material 22 coated thereon, and 21b is an uncoated second plate current collector. 21a is placed congruently on separator 17a, with the side bearing the cathode-active material facing down within cut-out window 19a. 21b is placed on top of anode 18 within cut-out window 19b.

The batteery alternatively can be saturated with electrolyte by placing it in a container from which the atmosphere is then removed with a vacuum pump. Liquid electrolyte is then allowed to enter the container, suffusing the battery with electrolyte. The vacuum is released, and the battery removed for heat sealing.

The seals are made by applying heat to the edges of the metal pieces, thereby sealing the gaskets to each other and to the edges of the 3 metal plates. Optionally the metal plates can be sealed to the gaskets in the beginning before further assembly. In this method only the two gaskets are sealed together after the electrolyte solution is added.

Figure 5:
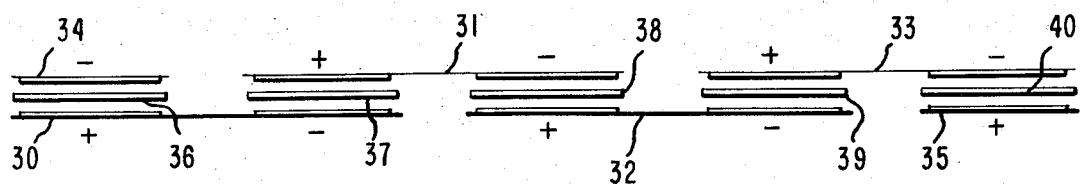
FIG. 5 is a schematic cross-sectional illustration of a multi-cell battery of the invention.

FIG. 5 illustrates a five- cell battery of the invention. In that figure, elements 30, 31, 32 and 33 represent conductive plates carrying anode material on one area of the inner side of the plate and cathode material on a second area of the inner side of the plate as indicated by the plus and minus signs. Second plate current collectors 34 and 35 are about half the size of first plate current collectors 30, 31, 32, and 33. Plate 35 bears active cathode material and forms the cathode contact for the battery. Plate 34 bears active anode material and forms the anode contact for the battery. Separators 36, 37, 38, 39, and 40 are between anodic and cathodic material. Sealing gaskets are not shown, but are applied in the same manner as for two-celled batteries.

Materials which can be used for anodes in the present batteries include the metals of Groups IA and IIA of the Periodic Table of which sodium, calcium and lithium are preferred. Other metals such as zinc can also be used as will be appreciated by those skilled in the art. Lithium is especially preferred an an anode metal because of its low equivalent weight and high equilibrium potential. Lithium is available in a high degree of purity and can be easily formed into shapes desired in flat batteries of this type.

The cathodes of the present batteries can be any material that is reducible by the anode substance. Materials most commonly used as cathodes in nonaqueous galvanic cells are halides, oxides, and sulfides of other elements such as lead, palladium, mercury, cadmium, silver, copper, nickel, cobalt, iron and manganese. Other materials which can be used include sulfur, silver chromate, tungsten oxide, vanadium oxides, silver orthophosphate and carbon fluoride. The cathode material can incorporate carbon or other highly conductive material to aid conductivity, and can also include polytetrafluoroethylene and other polymeric materials for binders. The preferred cathode materials are copper sulfide and heavy metal oxides.

In a preferred cell assembly, the active cathode material is adhered directly to tin-coated steel plate current collectors. In such a cell assembly, finely divided active material is mixed with a suitable polymeric adhesive substance, and, optionally, a conductive material such as carbon before depositing on the conductive plate.

A great many electrolytes have been disclosed as satisfactory for use in nonaqueous galvanic cells. For instance, electrolytes can be employed which are solutions in a nonaqueous solvent of a salt that provides a conductivity of at least about $1 \times 10^{-4}$ ohm$^{-1}$ cm$^{-1}$. The solvent, of course, must be substantially inert to the cell anode and cathode.

Representative electrolyte solvents include 1,3-dioxolane and its lower alkyl homologues such as 2-methyl or 4-methyldioxolane or 4,5-dimethyldioxolane, tetrahydrofuran and mixtures which can include straight chain and cyclic ethers, dialkyl carbonates, unsaturated heterocyclic compounds of low molecular weight or others. The preferred solvent is 1,3-dioxolane containing up to 1% 3,5-dimethylisoxazole.

The electrolyte solute must be sufficiently soluble to provide adequate conductivity, preferably over a broad temperature range. Commonly used solutes include lithium perchlorate which is most preferred, as well as potassium hexafluorophosphate, potassium thiocyanate, aluminum chloride, lithium tetrafluoroborate, etc.

The most preferred electrolyte composition for the cells of the present invention is:
58 parts 1,3-dioxolane,
25 parts 1,2-dimethoxyethane,
16.5 parts LiClO$_4$, and
0.5 part 3,5-dimethylisoxazole.

Another particularly satisfactory electrolyte composition is lithium perchlorate in tetrahydrofuran.

The gaskets used in the batteries must be inert to the cell's liquid contents and almost entirely impermeable to egress of liquid or vapor normally present in the cell, but not impermeable to egress of hydrogen which can be produced in very small amounts. The gasket must also be impermeable to entry of contaminants from the outside atmosphere.

The gasket material is also chosen so that it can form a desirable gas and liquid-tight seal when bonded to the flat plate sidewalls of the battery and when bonded, optionally, to a plastic gasket attached to the second sidewall. The material forming the two sidewalls need not be the same for both, nor is it necessary for the gasket material to be the same for each gasket when two gaskets are employed.

The plastic gasketing which seals the cell and unifies it in an integral composition must be sealable to the flat plte sidewalls of the cell (the current collectors), and also must be sealable to a second gasket, when two are employed, at a temperature below the decomposition temperature of the materials. Preferably, the seal between the gasket and the sidewall, whether it be metal or plastic, is made by heat sealing. Some plastics possess the property of being heat-sealable to metal surfaces to the extent that no additional adhesive or preliminary treatment save for cleaning is required. In some cases a pretreatment of the metal is necessary. Still other gasket materials may require an adhesive to bond the plastic to the metal.

Bonding of plastic materials to one another and to metal is well established in the art and is recorded in many publications such as the Plastics Engineering Handbook of the Society of The Plastics Industry, Inc., 3rd Edition, published by Reinhold Book Corp., New York, N.Y. As will be appreciated by those skilled in the art, both thermoplastic and thermosetting plastics can be employed which are sealable to themselves and/or to the sidewalls.

Contemplated gasket materials include polyethylene, polypropylene, copolymers of ethylene and acrylic or methacrylic acid and other polymers insoluble in the solvents employed and inert to the cell contents. A preferred plastic material is that class of ionic polymers prepared by copolymerizing ethylene and an unsaturated acid such as methacrylic acid and at least partially neutralizing the acidity of the copolymers with metal ions. These ionic polymers are described in detail in U.S. Pat. No. 3,264,272.

The materials used for the plate current collectors can be steel or any metal having the required degree of conductivity, compatibility and fabricability for the particular cells involved. For high energy density cells using tungsten oxide and lithium as the active electrode materials, tin-coated steel foil has been found to be particularly satisfactory.

The present invention provides a battery of two or more cells of no greater thickness than one cell. The amount of active material and also the energy available can be the same as for one cell of the same area, but the voltage is about doubled with a two-cell battery. The battery assembly lends itself easily to automation and is economical, since a two-cell battery is formed with fewer parts than required for two separate cells. The present batteries also have lower intercell resistance than batteries of stacked cells.

The flat batteries of the invention can be folded down the middle between two cells with the common plate inside the fold, or if desired, with the common plate facing outwardly on both sides of the fold. Batteries of the invention when transformed in this manner are still operable, and offer the same advantages of economy and ease of construction as in their monoplanar form.

The invention is further illustrated by the following example.

EXAMPLE

Two second plate current collectors are prepared from rectangular tin-coated low carbon steel foil plates 1.5 mils thick and 3.67 inches long by 1.67 inches wide. The two plates are cleaned to remove any oil or particulate matter. One of the two plates is coated over a rectangular area of 3.44 inches by 1.42 inches on one side with a deposit of blue tungsten oxide. A complete description of this material and the manner in which it can be adherently deposited on the steel plate are found in copending coassigned application Ser. No. 360,939 filed May 14, 1973, now U.S. Pat. No. 3,877,983 particularly in Example 2 of that application. The tungsten oxide coated plate forms the cathode of one cell of the battery of the invention.

The cathode preparation was carried out as follows: A solution was prepared of 0.4 gram of sodium carboxymethylcellulose in a 10 ml. of water, and to it were added 0.5 gram of finely divided conductive carbon and 10.0 grams of commercially available blue tungsten oxide of formula $WO_{2.7}$. The well-mixed, uniform suspension was poured into the 3.44 inch by 1.42 area of the one steel foil plate. A Gardner knife was drawn over it to obtain a smooth coating, and any excess removed from outside the 3.44 inch by 1.42 inch rectangular area. The coated plate was dried in an oven at 60°C. for several hours.

One rectangular plate of the same material and thickness of those above is prepared as a first place current collector, this plate having an area of 3.40 inches by 3.67 inches. In the same manner as described above, cathodically active blue tungsten oxide is coated on a rectangular area 3.44 inches by 1.42 inches on one side of this plate. This plate thus contains a cathode for one cell of a battery of the invention. It will also contact the active lithium anode of the second cell, as shown in FIG. 4.

Two nonconductive, rectangular plastic gaskets or spacers of 7.5 mils thickness each 3.77 inches by 3.48 inches are cut out as shown in FIG. 4, the cut-out holes being each 3.46 inches by 1.47 inches. The gasket material is a copolymer of ethylene and methacrylic acid, commercially available.

The gaskets are sealed to the metal plates by holding gasket and plate together in desired relationship and applying a metal block at 160°–165°C. to the metal for about 5 seconds under gentle pressure.

Two rectangular anode plates of 2 mil carbon steel foil each 3.44 inches by 1.42 inches are cleaned of foreign material. Each plate is coated on one side with a 1 mil layer of lithium metal by drawing the plate through a bath of the molten metal, and cooling the composite quickly. Lithium adhering to the second side of the plate is wiped off as the steel plate leaves the molten metal. The two lithium coated steel plates form the anodes for the two-cell battery.

Two rectangular nonconductive porous separators each 7 mils thick and 3.46 inches by 1.44 inches in area are prepared from ceramic fiber cloth. The separators are slightly larger than the anode plates so as to minimize any possibility of cell short circuiting.

An electrolyte solution was prepared to contain (by weight) 58 parts of 1,3-dioxolane, 25 parts of 1,2-dimethoxyethane, 16.5 parts of lithium perchlorate and 0.5 part of 3,5-dimethylisoxazole.

The battery is assembled as follows:

1. The two second plate current collectors, one bearing tungsten oxide cathodic material, are heat-sealed in symmetric fashion as shown in FIG. 1 to one of the plastic gaskets, the cathode material facing the plastic.

2. The single large first current collector is symmetrically aligned with and heat-sealed to the second plastic gasket, the side bearing the active cathodic material also facing the plastic.

With the metal plate-plastic gasket from (2) forming a base, metal side down, the battery was built up as follows:

3. One anode, lithium side up, is placed in one cavity of the gasket, the uncoated side of the anode contacting the uncoated metal side of the first plate current collector.

4. One of the two porous separators is then placed over the anode as assembled in step (3) and the second separator is placed in the second, parallel cavity in the gasket.

5. About 0.9 gram of electrolyte solution is then placed on and imbibed by each of the two porous separators.

6. The second anode is then congruently placed, lithium side down and facing the cathode material on the bottom plate and separated therefrom by the separator.

7. The two metal plate-plastic gasket composites prepared in step (1) are then placed symmetrically over the assembly, with the plate bearing the active cathode material facing the lithium coating on the anode plate from step (3).

8. The entire assembly is placed in a vaccum chamber, lightly clamped to prevent shifting of the various parts. The container is evacuated to remove air from the battery employing a vacuum pump. Then the battery is sealed, the gasket assembly of step (1) to gasket assembly of step (2) by applying heat to the two metal sides at the outline edge and to the slightly protruding gasket. The vacuum is released, the clamping mechanism removed, and the battery is ready for operation.

Batteries prepared in this manner furnish an open circuit voltage of 5.2 to 5.5 volts. They furnish about 4.2 to 4.4 volts when discharged under a 3.3 ohm load pulsewise, that is 1.1 seconds under load then a 3.0 second rest period before the next discharge period. Single cells of similar shape and size to the two-cell battery furnish energy at only 2.1 to 2.2 volts under the same discharge conditions.

I claim:

1. A battery of at least two flat galvanic cells of the type having a cathode and an anode of thin, flat configuration, a porous nonconductive separator between the cathode and the anode, and a conductive electrolyte contacting the anode, the cathode and the separator, the cells being disposed in the same plane and spaced apart from one another, wherein the improvement comprises at least one first plate current collector contacting an anode and cathode of two adjacent cells and providing at least part of a sidewall of the battery, and two second plate current collectors, each contacting the opposite electrode of one cell with which a first plate current collector is in contact, the second plate current collectors providing at least part of a sidewall of the battery.

2. A battery of claim 1 having two galvanic cells.

3. A battery of claim 1 wherein the first and second plate current collectors are tin-coated steel.

4. A battery of claim 1 wherein the anode comprises lithium.

5. A battery of claim 1 wherein the electrolyte comprises 1,3-dioxolane.

* * * * *